(12) United States Patent
Sorich

(10) Patent No.: US 7,740,204 B1
(45) Date of Patent: Jun. 22, 2010

(54) PROPULSION SYSTEM

(76) Inventor: Sam Sorich, 215 Bliss St., Medford, OR (US) 97501

( * ) Notice: Subject to any disclaimer, the term of this patent is extended or adjusted under 35 U.S.C. 154(b) by 869 days.

(21) Appl. No.: 11/480,136

(22) Filed: Jul. 3, 2006

(51) Int. Cl.
*B64G 1/22* (2006.01)
(52) U.S. Cl. .................................. 244/171.5; 244/171.1
(58) Field of Classification Search ............. 244/171.5, 244/171.1; 74/DIG. 9, 84 S; 60/201
See application file for complete search history.

(56) References Cited

U.S. PATENT DOCUMENTS

| | | |
|---|---|---|
| 1,953,964 A | 4/1934 | Laskowitz |
| 2,886,976 A | 5/1959 | Dean |
| 3,555,915 A | 1/1971 | Young, Jr. |
| 3,750,484 A | 8/1973 | Benjamin |
| 3,756,086 A | 9/1973 | McAlister et al. |
| 3,863,510 A | 2/1975 | Benson |
| 4,095,460 A * | 6/1978 | Cuff ........................... 74/84 S |
| 4,261,212 A | 4/1981 | Melnick |
| 4,579,011 A | 4/1986 | Dobos |
| 4,631,971 A | 12/1986 | Thornson |
| 4,712,439 A | 12/1987 | North |
| 5,054,331 A | 10/1991 | Rodgers |
| 5,860,317 A | 1/1999 | Laithwaite et al. |
| 5,966,986 A | 10/1999 | Laul |
| 6,135,392 A * | 10/2000 | Wakugawa .................. 244/164 |
| 6,345,789 B1 | 2/2002 | Rasmusson |
| 6,396,180 B1 * | 5/2002 | Blakesley .............. 310/156.08 |

* cited by examiner

*Primary Examiner*—Timothy D Collins
(74) *Attorney, Agent, or Firm*—Peter Loffler

(57) ABSTRACT

An extraterrestrial vehicle propulsion system uses a frusto-conical body member that is spun at high speeds by a drive member. A battery, which is rechargeable by a solar cell array, provides power to the drive member.

3 Claims, 2 Drawing Sheets

PROPULSION SYSTEM

BACKGROUND OF THE INVENTION

1. Field of the Invention

The present invention relates to a mechanical propulsion system for use by extraterrestrial vehicles.

2. Background of the Prior Art

It has been said that space is the final frontier and in the less than half century of space travel by man, incredible strides have been made. Satellite systems, moon walks, and reusable space vehicles are all examples of the extraordinary advances man has made in the exploration of space. However, with all of man's spectacular achievements in space, man is still in his infancy in the exploration of space.

One current limitation on space travel deals with extraterrestrial propulsion. During terrestrial travel, vehicles rely on Newton's third law of physics that states that for action there exists an equal and opposite reaction. Therefore, for example, a plane traveling through the air accelerates the air that it is flying through rearwardly in order to get a reaction and thus "push" through the air in order to accelerate and maintain velocity through the air. The fuel on board the vehicle provides the energy to drive the propulsion systems that drive the air rearward. Such propulsion systems need regular refueling. The problem for extraterrestrial vehicles is that unlike near earth conditions, space is a near vacuum and there is no air to push off of. While energy on many space vehicles is nearly infinite by using solar collectors, the ability to have a push off reaction is not. In order to achieve a reactionary push, the space vehicle is loaded with some form of fuel before being launched into space. As this fuel is burned, it provides the push to the space vehicle allowing the vehicle to accelerate and maneuver in the vacuum of space. The problem with such systems is that the fuel supplies on board are finite, and unlike earth, gas stations are not readily available. As even the most sophisticated satellites require occasional repositioning in space due to course errors caused by the earth's and moon's gravitational influences, all current satellites have a finite life span dictated by the amount of fuel on board.

In order to combat the propulsion problem, various mechanical systems have been proposed which systems, relying on the fact that electrical energy is plentiful, use an unbalanced force system in order to direct a force in a given direction. While such systems work with varying degrees of success, they tend to be unduly complex in design and construction and they take up a substantial amount of extremely valuable real estate that is otherwise needed for core function components on the space vehicle.

Therefore, there exists a need in the art for a propulsion system that can be used onboard a space vehicle, which propulsion system allows the vehicle to maneuver and accelerate. Such a system must not rely on a finite fuel supply in order to achieve its objective and must be of relatively simple and compact design and construction.

SUMMARY OF THE INVENTION

The propulsion system of the present invention can be used onboard a space vehicle, which propulsion system allows the vehicle to maneuver and accelerate within the vacuum of space. The propulsion system does not rely on a finite fuel supply in order to achieve its objective and is of relatively simple and compact design and construction.

The propulsion system of the present invention comprises a frusto-conical body member and a drive member that is operatively connected to the body member for rotating the body member about its longitudinal axis. A power source is coupled to the drive member for providing a source of power for operation of the drive member. The body member, the drive member, and the power source are each attached to an extraterrestrial vehicle. The power member is a battery which may be recharged by a solar cell array.

BRIEF DESCRIPTION OF THE DRAWINGS

Similar reference numerals refer to similar parts throughout the several views of the drawings.

DESCRIPTION OF THE PREFERRED EMBODIMENT

Figure 1:
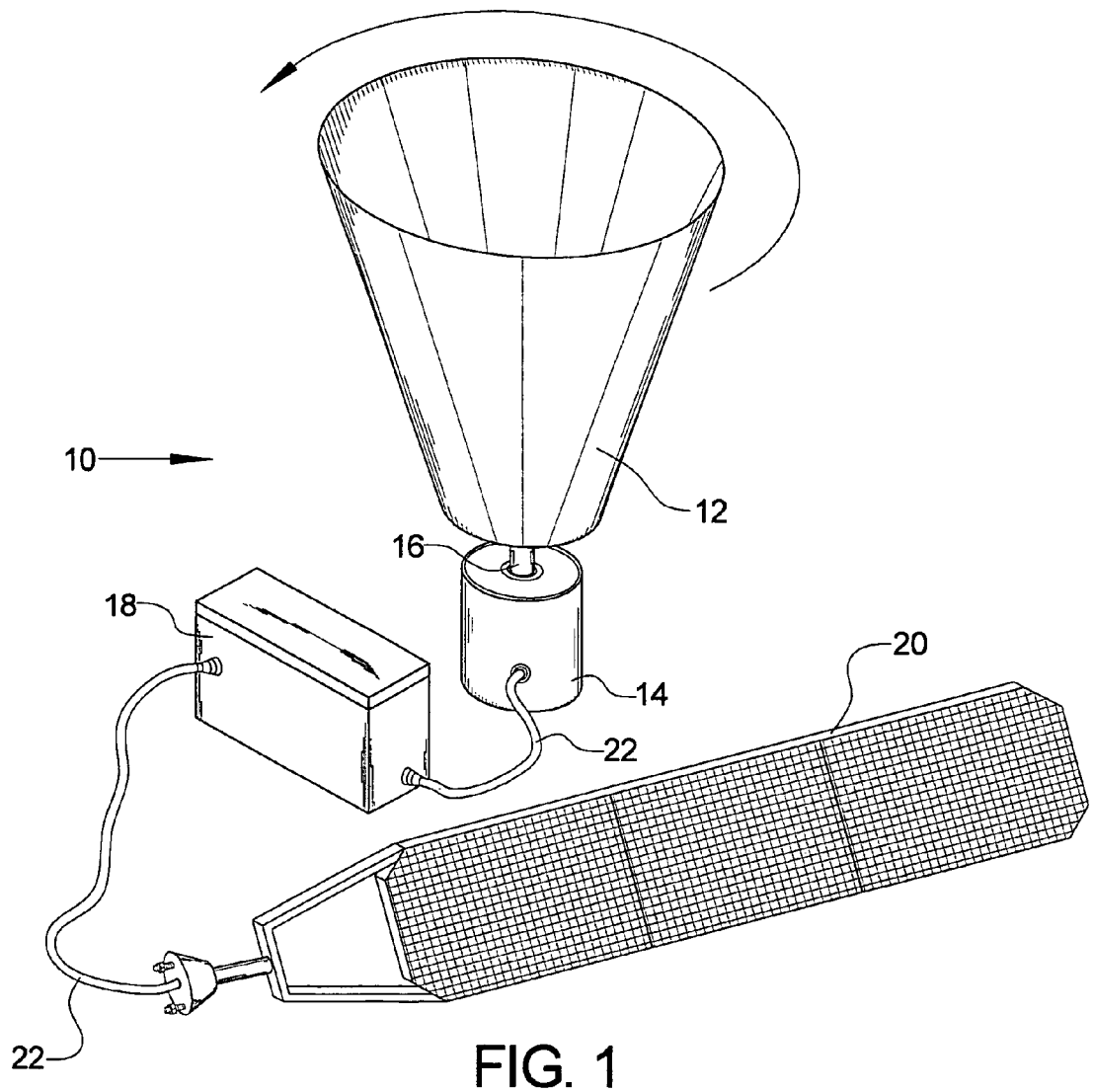
FIG. 1 is a perspective view of the propulsion system of the present invention.
Figure 2:
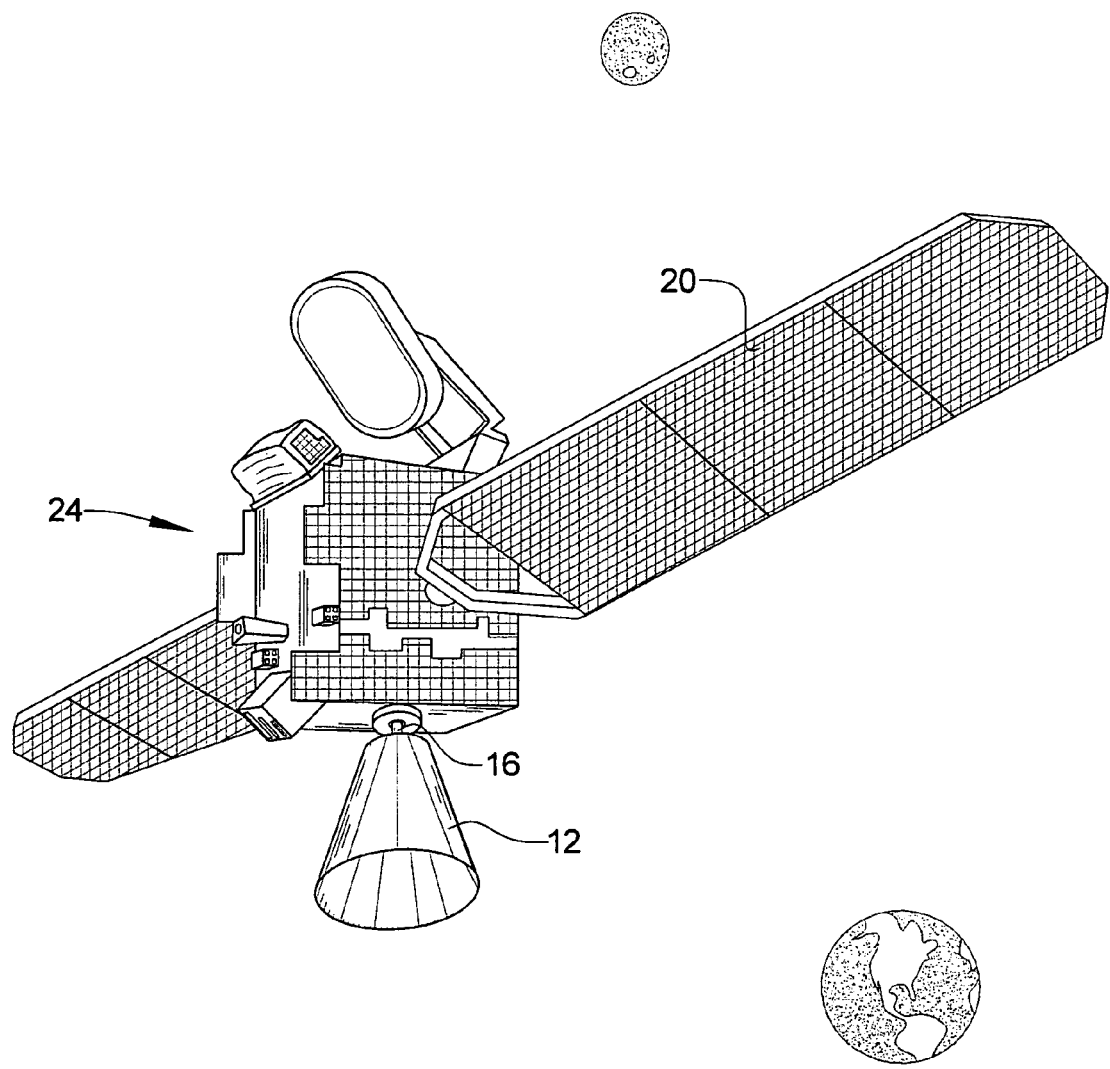
FIG. 2 is an environmental view of the propulsion system attached to an extraterrestrial vehicle.

Referring now to the drawings, it is seen that the propulsion system of the present invention, generally denoted by reference numeral 10, is comprised of a frusto-conical body member 12 that is rotatably attached to a drive member 14, via an appropriate shaft 16, such that the drive member 14 can rotate the body member 12 about its longitudinal axis. A power source 18 is coupled to the drive member 14 for providing a source of power for operation of the drive member 14. The power member 18 is a battery which may be recharged by a solar cell array 20. Appropriate wiring 22 connect the power member 18 with the drive member 14 and the power member 18 with the solar array 20.

The body member 12, the drive member 14, the power source 18, and the solar array 20 are each attached to an extraterrestrial vehicle 24 such as the illustrated satellite or a manned vehicle. At least the body member 12 and the solar array 20 are located external of the vehicle 24 and the body member 12 extends directly forward along the axis of direction of travel of the vehicle 24 such that the axis of travel of the vehicle passes through the longitudinal axis of the body member 12. Other than the drive member 14, the body member 12 is free of all other attachments such that the body member 12 is the terminal device of the overall propulsion system 10.

In operation, the body member 12 is rotated at high speed by the drive member 14, which rotation of the cone-shaped body member 12 causes propulsion of the body member in an axial direction away from the shaft 16 of the drive member 14, which in turn causes propulsion of the vehicle 24 to which the device 10 is attached. The solar array 20 is used to replenish electrical power to the battery 18 so that the drive member has a ready supply of electricity. The solar array 20, may be dedicated to the propulsion system 10 of the present invention or may be part of the vehicle's overall solar cell array that not only powers the drive member 14 but also other electrical components of the vehicle 24 in standard fashion. Appropriate means (not illustrated) as known in the art keep the solar array 20 in proper position to gather solar energy irrespective of the orientation of the vehicle 24.

While the invention has been particularly shown and described with reference to an embodiment thereof, it will be appreciated by those skilled in the art that various changes in form and detail may be made without departing from the spirit and scope of the invention.

I claim:

1. A vehicle system comprising:
   an extraterrestrial vehicle;
   a single frusto-conical body member having a relatively wide base and a relatively narrow tapered end;

a drive member attached to the vehicle and operatively connected to the body member for rotating the body member about its longitudinal axis such that the longitudinal axis of the body member extends forwardly along the axis of travel of the vehicle and such that the body member is free of all other attachments and such that the tapered end of the body member faces the vehicle;

a power source coupled to the drive member for providing a source of power for operation of the drive member.

2. The propulsion system as in claim 1 wherein the power member is a battery.

3. The propulsion system as in claim 2 further comprising a solar array for recharging the battery.

\* \* \* \* \*